(12) United States Patent
Shuey

(10) Patent No.: US 10,902,752 B2
(45) Date of Patent: Jan. 26, 2021

(54) LABEL STIFFENER SYSTEM FOR SHELVING AND PRODUCT DISPLAYS

(71) Applicant: Avery Dennison Corporation, Glendale, CA (US)

(72) Inventor: David J. Shuey, Cleveland, OH (US)

(73) Assignee: Avery Dennison Corporation, Glendale, CA (US)

( * ) Notice: Subject to any disclaimer, the term of this patent is extended or adjusted under 35 U.S.C. 154(b) by 242 days.

(21) Appl. No.: 15/502,386

(22) PCT Filed: Aug. 19, 2015

(86) PCT No.: PCT/US2015/045842
§ 371 (c)(1),
(2) Date: Feb. 7, 2017

(87) PCT Pub. No.: WO2016/028862
PCT Pub. Date: Feb. 25, 2016

(65) Prior Publication Data
US 2017/0221391 A1 Aug. 3, 2017

Related U.S. Application Data

(60) Provisional application No. 62/141,943, filed on Apr. 2, 2015, provisional application No. 62/038,910, filed on Aug. 19, 2014.

(51) Int. Cl.
*G09F 3/18* (2006.01)
*G09F 3/20* (2006.01)
(Continued)

(52) U.S. Cl.
CPC ............. *G09F 3/204* (2013.01); *B32B 7/06* (2013.01); *B32B 7/12* (2013.01); *B32B 7/14* (2013.01);
(Continued)

(58) Field of Classification Search
CPC ............ Y10T 428/2848; Y10T 428/14; Y10T 428/1476; G09F 3/10; G09F 3/02;
(Continued)

(56) References Cited

U.S. PATENT DOCUMENTS 3,494,056 A * 2/1970 Elzer .................. G09F 7/002
40/594
3,753,305 A 8/1973 Much
(Continued)

FOREIGN PATENT DOCUMENTS

GB 2211759 7/1989
GB 2424865 10/2006
(Continued)

OTHER PUBLICATIONS

International Preliminary Report on Patentability issued in corresponding IA No. PCT/US2015/045842 dated Feb. 21, 2017.
(Continued)

*Primary Examiner* — Shin H Kim

(57) ABSTRACT

Stiffening assemblies for use with labels or shelf label channels are described. The stiffening assemblies can be incorporated with one or more labels and provided so as to be conveniently used with shelf label channels or other point-of-sale displays.

23 Claims, 6 Drawing Sheets

(51) Int. Cl.

| | |
|---|---|
| *B32B 27/08* | (2006.01) |
| *B32B 27/36* | (2006.01) |
| *B32B 27/28* | (2006.01) |
| *B32B 7/12* | (2006.01) |
| *B32B 7/06* | (2019.01) |
| *G09F 3/10* | (2006.01) |
| *B32B 27/32* | (2006.01) |
| *B32B 27/30* | (2006.01) |
| *C09J 7/38* | (2018.01) |
| *C09J 7/22* | (2018.01) |
| *C09J 7/20* | (2018.01) |
| *B32B 7/14* | (2006.01) |
| *G09F 3/02* | (2006.01) |
| *C09J 121/00* | (2006.01) |
| *C09J 157/06* | (2006.01) |

(52) U.S. Cl.
CPC ............ *B32B 27/08* (2013.01); *B32B 27/283* (2013.01); *B32B 27/30* (2013.01); *B32B 27/32* (2013.01); *B32B 27/36* (2013.01); *B32B 27/365* (2013.01); *C09J 7/201* (2018.01); *C09J 7/22* (2018.01); *C09J 7/38* (2018.01); *G09F 3/10* (2013.01); *B32B 2255/10* (2013.01); *B32B 2255/26* (2013.01); *B32B 2270/00* (2013.01); *B32B 2519/00* (2013.01); *C09J 121/00* (2013.01); *C09J 157/06* (2013.01); *C09J 2203/334* (2013.01); *C09J 2301/162* (2020.08); *C09J 2301/204* (2020.08); *C09J 2301/302* (2020.08); *C09J 2400/226* (2013.01); *C09J 2421/00* (2013.01); *C09J 2425/006* (2013.01); *C09J 2433/00* (2013.01); *C09J 2467/006* (2013.01); *C09J 2469/006* (2013.01); *C09J 2483/005* (2013.01); *G09F 2003/0241* (2013.01); *G09F 2003/0248* (2013.01)

(58) Field of Classification Search
CPC ........... G09F 3/204; B32B 7/12; B32B 27/32; B32B 27/08; B32B 27/36; B32B 2255/10; B32B 2405/00; B32B 27/40; B32B 19/00
USPC .......................................... 40/661.09; 283/31
See application file for complete search history.

(56) References Cited

U.S. PATENT DOCUMENTS

| | | | |
|---|---|---|---|
| 3,977,109 A | 8/1976 | Berry et al. | |
| 4,179,138 A | 12/1979 | Bogdanovic | |
| 4,338,739 A | 7/1982 | Greenberger | |
| 4,807,807 A * | 2/1989 | Glick | B42D 15/027 206/813 |
| 4,889,234 A | 12/1989 | Sorensen et al. | |
| 5,209,959 A * | 5/1993 | McNaul | B44C 1/162 40/588 |
| 5,225,260 A * | 7/1993 | McNaul | G09F 7/00 40/588 |
| 5,240,789 A * | 8/1993 | Breen | G09F 3/02 40/626 |
| 5,273,798 A * | 12/1993 | Miner | G09F 3/10 283/81 |
| 5,428,914 A * | 7/1995 | Whitehouse | G09F 7/06 40/594 |
| 5,555,660 A * | 9/1996 | Whitehouse | G09F 7/06 40/594 |
| 5,597,634 A * | 1/1997 | Bloomer | G09F 3/02 383/101 |
| 5,709,297 A | 1/1998 | Brandriff et al. | |
| 6,026,603 A | 2/2000 | Kump et al. | |
| 6,037,042 A | 3/2000 | Kato et al. | |
| 6,145,231 A * | 11/2000 | Valiulis | A47F 5/0815 283/81 |
| 6,385,885 B1 * | 5/2002 | Valiulis | A47F 5/0815 283/81 |
| 6,482,288 B1 * | 11/2002 | Kreckel | A47G 1/17 156/247 |
| 6,579,585 B1 | 6/2003 | Garvic et al. | |
| 6,596,359 B2 | 7/2003 | Roth et al. | |
| 6,667,086 B2 * | 12/2003 | Dronzek, Jr. | B32B 7/06 156/297 |
| 6,706,342 B2 * | 3/2004 | Kong | B32B 27/32 206/459.5 |
| 6,926,942 B2 | 8/2005 | Garvic et al. | |
| 6,981,343 B2 | 1/2006 | Rawlings et al. | |
| 7,368,033 B2 | 5/2008 | Eckstein et al. | |
| 7,709,072 B2 | 5/2010 | Caveney et al. | |
| RE43,261 E | 3/2012 | Utz | |
| 8,166,688 B1 | 5/2012 | Fragnoli | |
| 8,304,073 B2 * | 11/2012 | Davies | C09J 7/0296 156/701 |
| 8,613,154 B2 | 12/2013 | Fragnoli | |
| 2003/0031861 A1 | 2/2003 | Reiter et al. | |
| 2004/0151922 A1 * | 8/2004 | Cohen | B32B 5/02 428/458 |
| 2005/0126060 A1 * | 6/2005 | Rawlings | G09F 3/0288 40/661.03 |
| 2006/0110561 A1 | 5/2006 | Arippol | |
| 2006/0263564 A1 * | 11/2006 | Steyaert | B32B 5/18 428/42.3 |
| 2008/0075947 A1 * | 3/2008 | Padiyath | B32B 27/20 428/323 |
| 2011/0123752 A1 | 5/2011 | Mellis et al. | |
| 2011/0146126 A1 * | 6/2011 | Phillips | A47G 1/0633 40/738 |
| 2011/0253301 A1 * | 10/2011 | Yamanaka | B32B 7/12 156/247 |
| 2013/0101775 A1 * | 4/2013 | Dennison | B32B 27/08 428/41.3 |
| 2013/0145665 A1 * | 6/2013 | Mitchell | G09F 3/10 40/638 |
| 2013/0221021 A1 | 8/2013 | Tani et al. | |
| 2015/0248853 A1 * | 9/2015 | Pattison | G09F 15/02 40/594 |

FOREIGN PATENT DOCUMENTS

| | | |
|---|---|---|
| JP | 2013114040 | 6/2013 |
| WO | 98/22926 | 5/1998 |

OTHER PUBLICATIONS

International Search Report and Written Opinion issued in corresponding IA No. PCT/US2015/045842 dated Oct. 16, 2015.

* cited by examiner

LABEL STIFFENER SYSTEM FOR SHELVING AND PRODUCT DISPLAYS

CROSS-REFERENCE TO RELATED APPLICATION

The present application is a 371 of International Application No. PCT/US15/45842, which was published in English on Feb. 25, 2016, and claims the benefit of U.S. Provisional Patent Application No. 62/038,910 filed Aug. 19, 2014, and U.S. Provisional Patent Application No. 62/141,943 filed Apr. 2, 2015 all of which are incorporated herein by reference in their entireties.

FIELD

The present subject matter relates to stiffening and affixment systems and related methods for use with labels and shelving or other point-of-sale displays.

BACKGROUND

Shelving and/or product display systems such as used in stores and retail environments typically include label channels or other assemblies along which labels are attached to provide information concerning product(s) on the shelves or displays. The label channels are often located along a front face of the shelving or displays so that consumers can view the labels attached thereto.

Labels are frequently replaced as products or their location on shelving or displays change, or as prices of products change. As a result, labels generally include an adhesive along their rear face which enable labels to be conveniently removed from and adhered to the shelving label channel.

Although satisfactory in many respects, in certain applications it may not be possible to achieve label adherence or if initially adhered, the adhesive bond may fail resulting in loss of the label and its information from a particular location on the shelf or display. For example, it is often not possible or at least may be difficult to adhere a label in low temperature environments such as freezers or coolers. Another example is high humidity environments which can result in poor adhesive bond or failure thereof.

Accordingly, a need exists for new systems and related methods for securely attaching labels to shelving and/or label channels.

SUMMARY

The difficulties and drawbacks associated with previous approaches are addressed in the present subject matter as follows.

In one aspect, the present subject matter provides a label stiffener system comprising a first support defining a front face and a rear face, a second support defining a front face and a rear face, a layer of a first adhesive disposed between the first and the second support, and a patterned region of a second adhesive disposed on the front face of the first support.

In another aspect, the present subject matter provides a combined label and stiffener system comprising a label, and a stiffener system. The stiffener system includes (i) a first support defining a front face and a rear face, (ii) a second support defining a front face and a rear face, (iii) a layer of a first adhesive disposed between the first and the second support, and (iv) a patterned region of a second adhesive disposed on the front face of the first support. The label is adhered to the patterned region of the second adhesive of the stiffener system.

In still another aspect, the present subject matter provides a method for affixing a label to a label channel. The method comprises providing a label, providing a label channel defining a receiving region, and providing a stiffener system including (i) a first support defining a front face and a rear face, (ii) a second support defining a front face and a rear face, (iii) a layer of a first adhesive disposed between the first and the second support, and (iv) a patterned region of a second adhesive disposed on the front face of the first support. The method also comprises adhering the label to the patterned region of the second adhesive of the stiffener system. The method additionally comprises inserting the stiffener system in the receiving region of the label channel, thereby affixing the label to the label channel.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
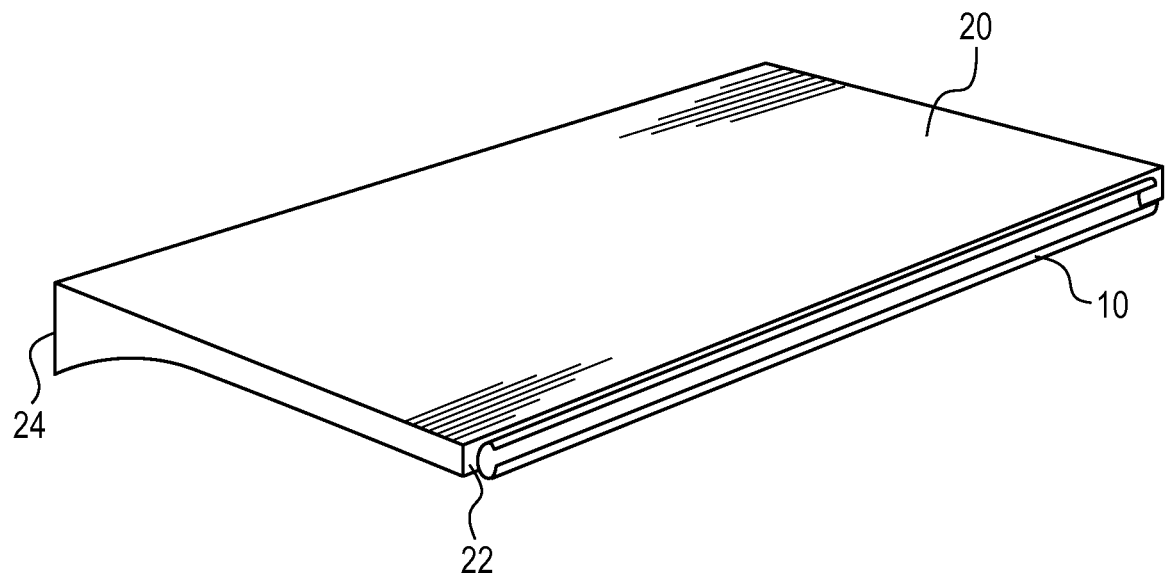
FIG. 1 is a perspective view of a typical shelf and a label channel extending along a front face or edge of the shelf.

The present subject matter provides a stiffener system and a combined label and stiffener system that can be used with a wide array of label channels and other point-of-sale displays. The stiffener system is a relatively thin, multilayered assembly that can be economically manufactured using high speed processes, and includes provisions that enable one or more labels, tags, or other placards to be readily retained by the stiffener prior to and/or after engagement of the stiffener with a label channel or other point-of-sale display(s). The present subject matter also provides related methods of use of the stiffener system and one or more labels.

Stiffener System

The stiffener system of the present subject matter is a multilayer assembly and generally comprises a first frontwardly positioned support, a second rearwardly positioned support, a layer or region of adhesive disposed between and adhesively affixing the first and second supports together, a layer or region of patterned adhesive disposed along a front face of the first support, and an optional layer or region of a release agent disposed along a rear face of the second support. Each of the supports is a thin, planar sheet-like member. The various references to "front" and "rear" are with regard to the stiffener upon its engagement or installation with a typical label channel provided along a front shelf edge. This is described in greater detail herein in association with the figures.

In certain embodiments, the stiffener system is configured to engage and be retained with a label channel such as is typically used in many retail stores and sales outlets. In these embodiments, the stiffener system is sized and shaped to be received within the label channel and in particular instances, undergo deformation from a relatively flat or planar configuration upon engagement within the label channel. Typically upon installing the stiffener system with a label channel, the stiffener is deformed such that when viewed from a side of the stiffener, the stiffener exhibits an arcuate or "bowed" profile. This deformation from the stiffener's initial flat configuration promotes retention of the stiffener within the label channel. These aspects are all described in greater detail herein and particularly in conjunction with FIGS. 7-12.

In many embodiments, the stiffener system includes one or more patterned regions of adhesive along a front face of the stiffener. One or more labels can be adhered to the stiffener along the patterned adhesive. The patterned adhesive promotes independent deformation of the stiffener without, or at least to a reduced extent, accompanying deformation of a label adhered along the front face of the stiffener. These aspects are described in greater detail herein.

The stiffener system in many embodiments also optionally includes a layer or region of release material such as a silicone release agent along a rearward face of the stiffener. The use of such release layer enables a continuous length of the stiffener system to be wound or provided in a roll form without sticking or occurrence of unintended adherence between adjacent contacting regions. In addition, in certain uses, the release material if exhibiting a relatively low coefficient of friction, may promote insertion or engagement of the stiffener in a label channel. For example, in certain applications, a section of stiffener may be inserted within an open end of a label channel and then longitudinally slid along the length of the channel until a desired placement or location is reached.

The first and second supports of the stiffener system can be formed from a variety of materials so long as upon incorporation in the stiffener system, the supports provide the requisite rigidity and stability for retaining one or more labels upon engagement of the stiffener with a label channel or other point-of-sale display. A wide array of materials could potentially be used for the first and second supports. For example, the supports could be formed from one or more paper based materials. Alternatively or in addition, the supports could be formed from one or more polymeric materials. Nonlimiting examples of polymeric materials include polyvinyl chloride (PVC), polyolefins such as polyethylene (PE) and/or polypropylene (PP), polyethylene terephthalate (PET), polycarbonate (PC), polystyrene (PS), and combinations of these and other materials. Composite materials and combinations of paper and polymeric materials could also be used.

In many embodiments, both supports are formed from PET. The material(s) selected for the first and second support can be the same as one another, or the materials may be different from one another.

In many embodiments, the thickness of each of the supports, i.e., the first support and the second support, is within a range of from about 1 mil to about 7 mils. In particular embodiments, the first support layer can be within a range of 3-4 mil. In another embodiment, the second support layer can be within a range of 1-2 mil. In a preferred embodiment, the first support layer is 3.8 mil. In another preferred embodiment, the second support layer is 1.4 mil. The use of PET for the first and the second support and at a thickness of 3.8 mil for the first support and 1.4 mil for the second support has been found to provide the resulting stiffener system with excellent attributes such as economical manufacture, relatively high strength and durability, and ability to elastically deform upon placement in certain label channels and exert a compressive force within the channel that promotes retention of the stiffener system within the channel.

The stiffener system includes a layer or region of adhesive disposed between the first and the second supports, and another layer or region or adhesive which is typically a patterned layer or region, disposed along a front face of the stiffener system. The adhesive(s) selected for the layer between the supports and the patterned region could be the same or different. In addition, the present subject matter also includes the use of a patterned adhesive between the first and the second supports.

A wide array of adhesives can be used in the stiffener systems of the present subject matter. For example, drying or solvent based adhesives, pressure sensitive adhesives, structural adhesives, contact adhesives, hot melt adhesives, reactive adhesives, and combinations thereof can be used in the stiffeners of the present subject matter. In many embodiments, the adhesive is a pressure sensitive adhesive. And in particular embodiments, multiple adhesives can be used such as combinations of pressure sensitive adhesives with structural adhesives.

A description of useful pressure sensitive adhesives (PSAs) may be found in *Encyclopedia of Polymer Science and Engineering*, Vol. 13, Wiley-Interscience Publishers (New York, 1988). Additional description of useful PSAs may be found in *Polymer Science and Technology*, Vol. 1, Interscience Publishers (New York, 1964). Conventional PSAs, including acrylic based PSAs, polyurethanes, rubber based PSAs and silicone based PSAs are useful. The PSA may be a solvent based or may be a water based adhesive. Hot melt adhesives may also be used. In one embodiment, the PSA comprises an acrylic emulsion adhesive.

In certain embodiments, the layers of adhesive may be formed from an acrylic based polymer. It is contemplated that any acrylic based polymer capable of forming an adhesive layer with sufficient tack to adhere to a substrate or other surface may function in the present subject matter. In certain embodiments, the acrylic polymers for the pressure sensitive adhesive layers include those formed from polymerization of at least one alkyl acrylate monomer containing from about 4 to about 12 carbon atoms in the alkyl group, and present in an amount from about 35-95% by weight of the polymer or copolymer, as disclosed in U.S. Pat. No. 5,264,532. Optionally, the acrylic based pressure sensitive adhesive might be formed from a single polymeric species. In one embodiment the layer of first adhesive is an acrylic adhesive. In another embodiment, the layer of second adhesive, on the front face of the stiffener system, is an acrylic adhesive.

In certain embodiments, one or more of the adhesive layers can be an acrylic hybrid adhesive. The acrylic hybrid can be acrylic-rubber hybrid, acrylic-silicone hybrid adhesive, or any other acrylic hybrid adhesives known in the art. In a preferred embodiment, at least one adhesive layer is an acrylic-rubber adhesive. In another embodiment, the layer of second adhesive, on the front face of the stiffener system, is an acrylic-rubber adhesive. The acrylic-rubber hybrid can be DURO-TAK AH 115™, produced by Henkel. Acrylic-rubber hybrids can be a pressure sensitive adhesive solution that provides adhesion to a wide variety of surfaces, such as low energy surfaces.

In certain embodiments, one or more of the adhesive layers can be a rubber based pressure sensitive adhesive. The rubber based adhesive can include one or more rubber elastomers and a tackifier. Useful rubber elastomers include the block polymers of styrene and dienes, as well as ethylene-propylene elastomers, including diene terpolymers, styrene olefin copolymers like styrene ethylene, propylene or butylene block polymers. Styrene diene polymers are particularly useful, such as styrene isoprene copolymers and styrene butadiene copolymers. In one embodiment, the layer of second adhesive, on the front face of the stiffener system, is a rubber based adhesive.

As previously described, the stiffener system includes a layer and/or region(s) of patterned adhesive along a front face of the stiffener. In many embodiments, the patterned adhesive extends within a central region of the stiffener and particularly along a front face of the first support, and does not extend along upper and lower peripheral edge regions of the stiffener and particularly the upper and lower peripheral edge regions of the front face of the first support. Thus, the upper and lower edge regions of the front face of the first support are free, or at least substantially free, of adhesive. These aspects are described in greater detail herein in association with the figures. Thus, the term "patterned adhesive" refers to coverage of the adhesive on the front face of the first support which is less than 100% coverage, in many embodiments less than 90% coverage, and in still other embodiments less than 80% coverage such as for example 75% coverage, 65% coverage, or 50% coverage. As described herein, utilizing a patterned adhesive layer along a front face of the stiffener and providing for adhesive-free peripheral upper and lower edge regions enables the label when adhered to the stiffener to adopt a relatively independent orientation. In certain instances, the label may be able to retain a relatively planar orientation.

The adhesive thickness or coatweight used for both the first and second adhesives depends upon several factors including the adhesive type, adhesive characteristics, and/or the application technique. However, for many embodiments, a coatweight of from about 1 gram/m$^2$ (gsm) to about 135 gsm (typically corresponding to about 5 mils) can be used. For certain embodiments, an adhesive coatweight of from about 18 gsm to about 110 gsm has been found acceptable. In one embodiment, the layer of first adhesive is from 18-30 gsm. In another embodiment, the layer of second adhesive is from 25-110 gsm.

As noted, the stiffener system may also comprise a layer or region of release material along a rear face of the stiffener system. The release material is on an opposite face of the stiffener system as compared to the patterned adhesive. Typical coatweights for the release material are within a range of from 0.4 to 4.5 gsm. In certain embodiments, a coatweight of 1.0 gsm of a silicone release material has been found suitable. However, it will be understood that the present subject matter includes the use of coatweights less than 0.4 gsm and/or greater than 4.5 gsm.

The stiffener system may also comprise a release liner that covers the patterned adhesive prior to use and label application. The release liner may be monolayered or multilayered. A monolayered release liner may comprise a paper based layer or polymeric based layer. A multilayered release liner may have two or more layers selected from the group including a paper based layer, a polymeric based layer, and combinations of two or more of any of the foregoing layers. The polymeric based layer may include a thermoplastic resin such as a polyolefin, a polyester, or a mixture of the two. However, in many embodiments a label is provided with the stiffener system and is adhered to the patterned adhesive during or soon after manufacture. The label can remain with the stiffener during and after attachment to a label channel. These aspects are described in greater detail herein.

If a release liner is use, the release liner typically comprises a release coating on the release liner which is releasably joined to a corresponding surface of the adhesive layer. The release coating can comprise any coating that allows the release liner to be removed from the adhesive layer during the labeling process without damaging the adhesive. The release coating may comprise an organosiloxane polymer. The release liner can vary in thickness as needed for a given application. (Release liners are available from release liner suppliers that include Huhtamaki and International Paper.

In many embodiments, the thickness of the stiffener system is from about 2 mils to about 12 mils, particularly from 3 mils to about 10 mils, and in certain applications 5 mils.

Labels

The present subject matter also relates to a combined assembly of a stiffener system with one or more labels. The term "label" is used to refer to nearly any display, placard, sheet identifier, card, and/or retail tag typically used to provide product information and/or price information in a store or other retail setting. The labels can be associated and typically adhesively retained with the stiffener system by use of the patterned layer or region of adhesive along a front face of the stiffener system. In certain embodiments, a combined assembly of labels and stiffener(s) are provided which may be in the form of a roll or wound product. However, it will be appreciated that the present subject matter is not limited to wound rolls, and instead could be in the form of flat sheets, Z-fold sheets, or other forms.

Nearly any label type can be used in accordance with the present subject matter. Typically, such labels are formed from paper, paper based materials, polymeric materials, and/or combinations thereof. The labels typically include text, bar codes, or other indicia and convey information such as product or store information. The labels may in certain applications include one or more protective films or overcoats.

Representative Embodiments

FIG. 1 is a perspective view of a shelf 20 having a receiving channel 10 or other like component extending along a frontward or outwardly directed edge 22 or face of the shelf 20. The channel 10 is a representative and nonlimiting example of a label channel as described herein. The shelf 20 also defines a rearwardly directed region generally shown as 24. The shelf 20 may be mounted on a wall or be free standing and thus likely be part of a rack or other support assembly.

Figure 2:
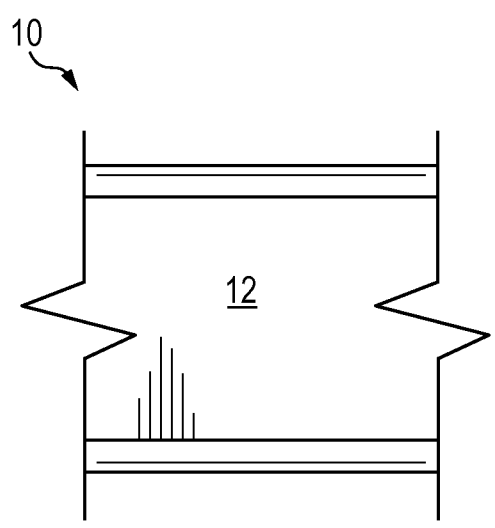
FIG. 2 is a schematic front view of the label channel depicted in FIG. 1.
Figure 3:
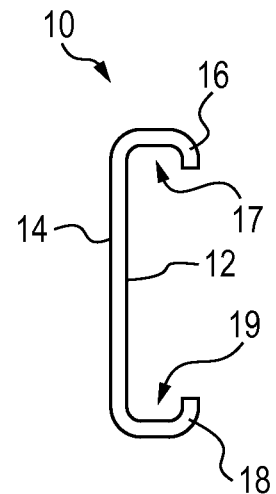
FIG. 3 is a schematic side view of the label channel shown in FIGS. 1 and 2.

FIGS. 2 and 3 illustrate the label channel 10 depicted in FIG. 1. FIG. 2 is a front view of the label channel 10 in which an inner face 12 of the label channel is generally exposed.

FIG. 3 is a schematic side or end view of the label channel 10 in which it can be seen that the channel defines a receiving region and in many instances generally exhibits a C-shaped profile. The channel 10 generally comprises an upper flanged member 16, a lower flanged member 18, and a wall 14 extending between the upper and lower flanged members 16 and 18. An upper receiving region 17 is defined by the upper flanged member 16 and a lower receiving region 19 is defined by the lower flanged member 18. The upper and lower receiving regions 17, 19, and the inner face 12 generally define a receiving region. As described in greater detail herein, the upper and lower flanged members 16 and 18 serve to retain peripheral edge regions of one or more stiffener systems upon insertion within the channel 10. The interior channel width of the channel 10 shown in FIG. 3 is measured from an inner face of the upper flanged region 16 to an inner face of the lower flanged region 18, and generally taken parallel to the inner face 12. As previously noted, many conventional channels have an interior channel width of 1.25 inches.

Figure 4:
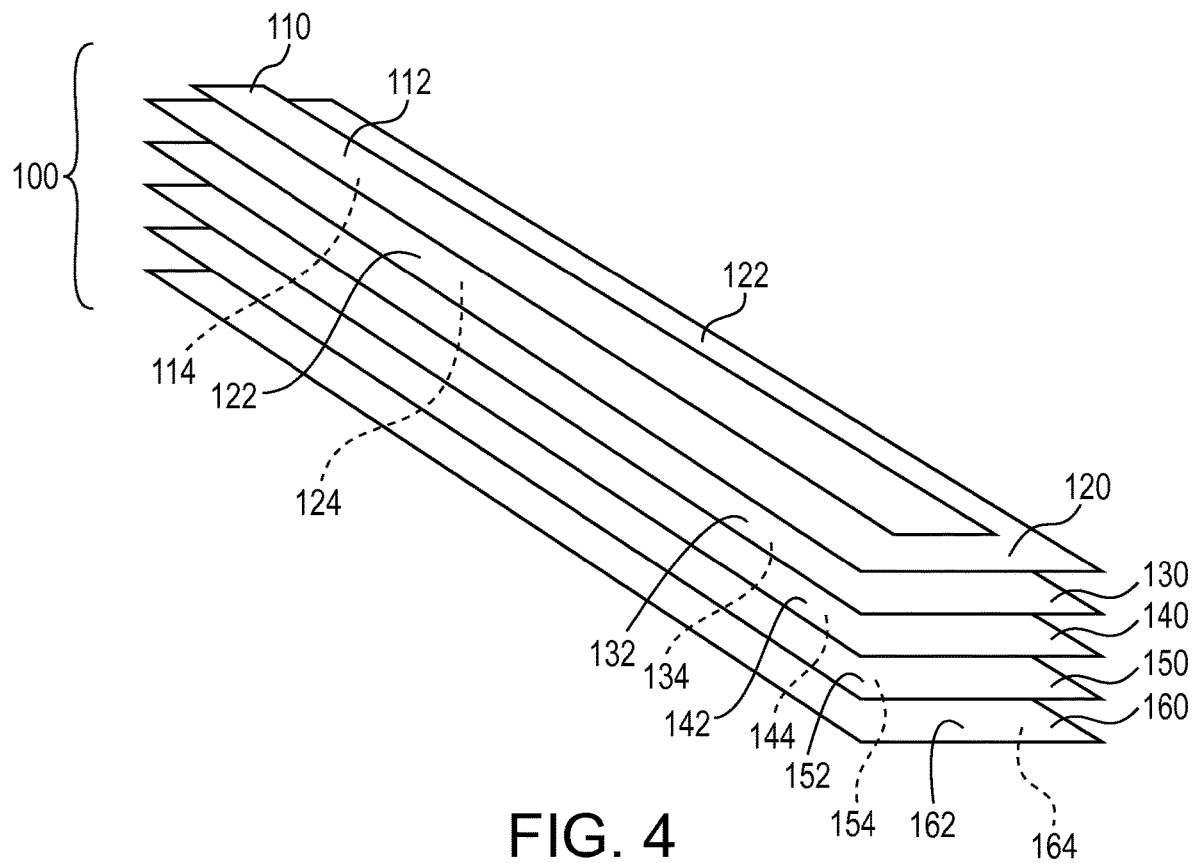
FIG. 4 is an exploded schematic view illustrating an embodiment of a stiffener system for use with a label in accordance with the present subject matter.

FIG. 4 is an exploded perspective schematic view of a stiffener system 100 in accordance with the present subject matter. The stiffener system 100 comprises a first support member 120, a second support member 140, a layer or region of a first adhesive 130 disposed between the support members 120 and 140, and a second layer or region of a patterned second adhesive 110 disposed on the first support member 120. The stiffener system 100 may also comprise, and in many embodiments additionally comprises, a layer of a release material 160 disposed along a rearward face of the resulting stiffener system. The stiffener system 100 may optionally comprise one or more other layers collectively shown as layer 150 in FIG. 4. Specifically, the first support member 120 defines a front face 122 upon which is disposed the patterned adhesive 110. An outer and frontwardly directed face 112 of the patterned adhesive 110 serves to adhesively retain one or more labels as described in greater detail herein. A rear face 114 of the patterned adhesive 110 is directed toward the front face 122 of the first support 120. The layer 130 of the first adhesive defines a front face 132 which is directed toward a rear face 124 of the first support 120, and a rear face 134 which is directed toward a front face 142 of the second support 140. The layer 160 of the release material defines a front face 162 which is directed toward a rear face 144 of the second support 140. Generally, a rear face 164 of the release layer 160 is exposed and constitutes a rearward face of the resulting stiffener system 100. If an optional layer 150 is utilized, that layer or collection of layers defines a front face 152 which is directed toward the rear face 144 of the second support 140, and a rear face 154 which is directed toward the front face 162 of the release layer 160. It will be understood that the present subject matter includes a wide array of alternate arrangements and configurations. For example, one or more additional layers or components could be incorporated or positioned between any of the layers or regions 110, 120, 130, 140, 150, and/or 160.

Figure 5:
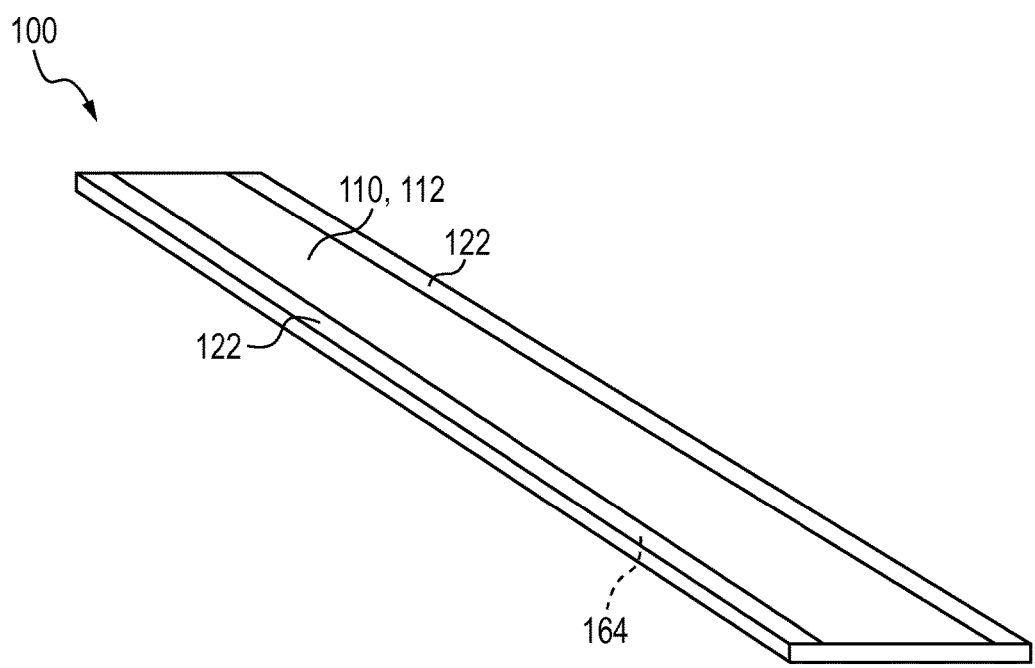
FIG. 5 is a perspective schematic view of the stiffener system depicted in FIG. 4 in accordance with the present subject matter.

FIG. 5 is a perspective schematic view of the stiffener system 100 after assembly or manufacture. Exposed along a front face of the stiffener is the front face 112 of the patterned adhesive 110 and one or more regions 122 of the front face of the first support 120. The peripheral edge regions 122 are generally free of adhesive. Exposed along an oppositely directed rear face of the stiffener is the rear face 164 of the release layer 160. If a release layer 160 is not used in the stiffener system, then the rear face of the stiffener is provided by the rear face 144 of the second support 140. And, if one or more optional layer(s) 150 are used as shown in FIG. 4 and without the release layer 160, then the rear face of the stiffener is provided by the rear face 154 of the layer 150.

Figure 6:
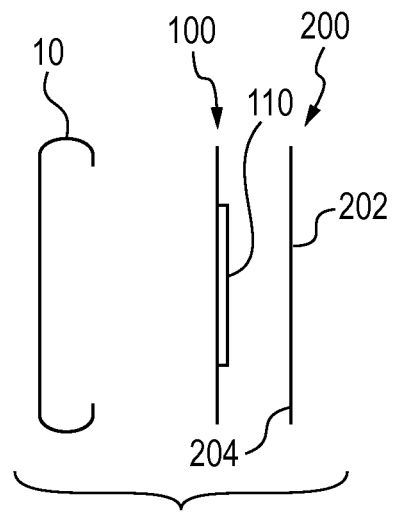
FIG. 6 is a side schematic view illustrating a stiffener system and a label prior to engagement with a label channel in accordance with the present subject matter.

As previously described, one or more labels can be adhered along the front face of the stiffener 100 by adhesively attaching the label(s) to the patterned adhesive 110 of the stiffener 100. FIG. 6 is a side schematic view illustrating a typical label channel 10, the stiffener system 100 including a frontwardly directed patterned adhesive 110, and a label 200 defining a front face 202 and oppositely directed rear face 204. As will be understood, the label 200 is adhered to the stiffener 100 by the patterned adhesive 110. Specifically, a rear face 204 of the label is contacted and adhered with the patterned adhesive 110 to thereby attach the label 200 to the stiffener 100. The stiffener 100, and in many applications the stiffener and the label 200, are then inserted or otherwise positioned within the label channel 10.

Figure 7:
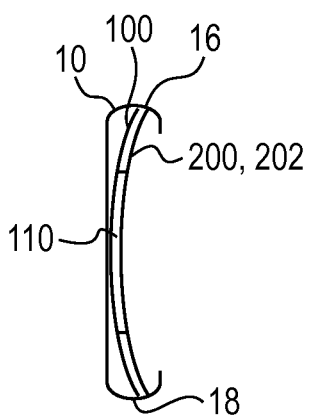
FIGS. 7-12 illustrate various positions adopted by the stiffener system and the label upon engagement with the label channel in accordance with the present subject matter.
Figure 8:
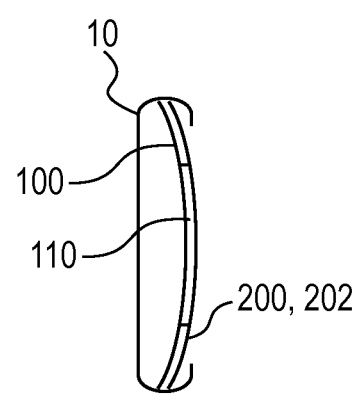
Figure 9:
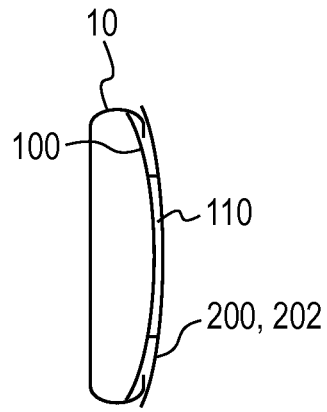
Figure 10:
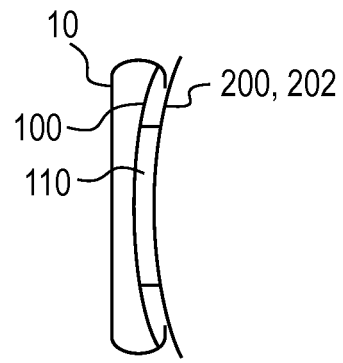
Figure 11:
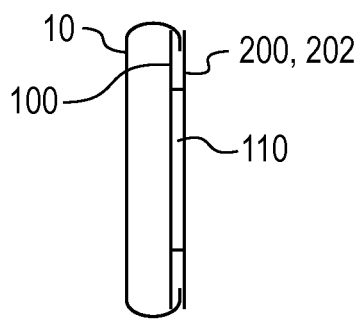
Figure 12:
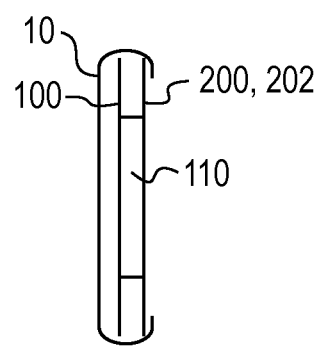

The present subject matter includes a wide array of configurations, orientations, and/or associations between the channel 10, the stiffener 100, and the label 200 upon their respective affixment and/or engagement with one another. FIGS. 7-12 schematically depict representative and nonlimiting possible engagement configurations between the components. For example, FIG. 7 illustrates an engagement in which both the stiffener 100 and the label 200 are positioned within the channel 10. The upper edge regions of both the stiffener 100 and the label 200 are captured by the upper flanged member 16, and lower edge regions of both the stiffener 100 and the label 200 are captured by the lower flanged member 18. FIG. 7 also illustrates a "bowed" or flexed orientation of both the stiffener 100 and the label 200. The orientation is recessed or concave with respect to the front open face of the channel. FIG. 8 illustrates a similar engagement as described for FIG. 7 but a bulging or convex orientation of both the stiffener 100 and the label 200. FIG. 9 illustrates an engagement in which only the stiffener 100 is positioned within the channel 10 and the label 200 is positioned outside of the channel 10. In this configuration, the stiffener 100 is in a convex orientation. The label 200 may be in a planar orientation or may adopt a convex or slight convex orientation. FIG. 10 illustrates a similar engagement as described for FIG. 9 but depicts the stiffener 100 in a concave orientation. The label 200 may be relatively planar or may exhibit a similar or slight concave orientation. FIG. 11 illustrates an engagement in which only the stiffener 100 is captured by the channel 10 and the label 200 extends outside of the channel 10. In this configuration, both the stiffener 100 and the label 200 are relatively planar in their orientation. FIG. 12 illustrates another engagement in which both the stiffener 100 and the label 200 are disposed within, and captured by, the channel 10; and both the stiffener 100 and the label 200 are in a planar orientation.

Figure 13:
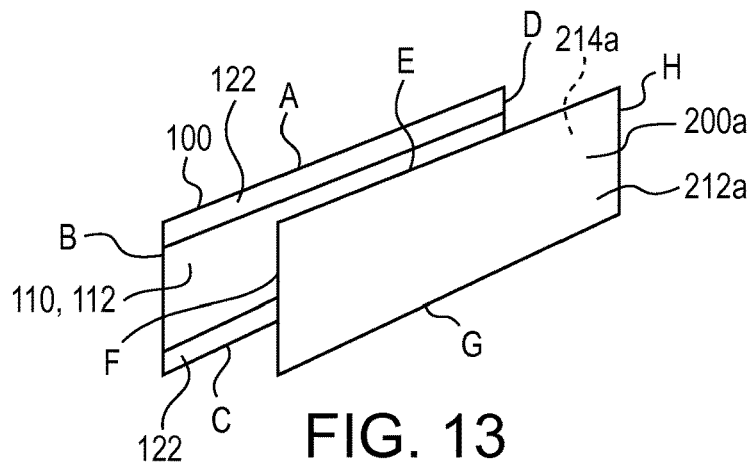
FIG. 13 is a perspective schematic view depicting a label stiffener system and label prior to their adherement to one another in accordance with the present subject matter.

The present subject matter includes a wide array of stiffener and label orientations and size/shape combinations. For example, FIG. 13 illustrates a stiffener 100 defining an upper edge A, a bottom edge C, and side edges B and D extending therebetween. FIG. 13 also illustrates a label 200a defining a front face 212a, an oppositely directed rear face 214a, an upper edge E, a bottom edge G, and side edges F and H extending therebetween. As previously described, the label 200a is adhered to the stiffener 100 by contacting the rear face 214a of the label 200a with a front face 112 of the patterned adhesive layer 110. In this particular version of stiffener and label, upon placement and adherence of the label 200a with the stiffener 100, the upper edges A and E are generally aligned with one another, the lower edges C and G are generally aligned with one another, and in certain embodiments the side edges B and F; and/or D and H are also aligned with each other. FIG. 13 also depicts an upper edge region proximate edge A of the front face 122 of the first support of the stiffener 100 which is free of adhesive 110. FIG. 13 also depicts a lower edge region proximate edge C of the front face 122 of the first support of the stiffener 100 which is free of adhesive 110.

Figure 14:
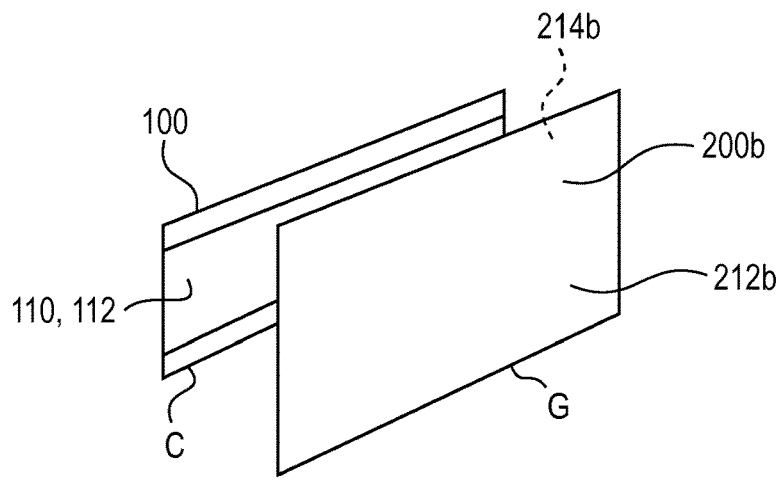
FIG. 14 is a perspective schematic view depicting a label stiffener system and another label prior to their adherement to one another in accordance with the present subject matter.

FIG. 14 depicts an alternate arrangement in which at least one edge and more particularly, a bottom edge G of the label 200b extends beyond the bottom edge C of the stiffener 100. The label 200b defines a front face 212b and an oppositely directed rear face 214b. The top edges and/or one or both pairs of the side edges of the stiffener 100 and the label 200b may be generally aligned with one another as previously described in conjunction with FIG. 13.

Figure 15:
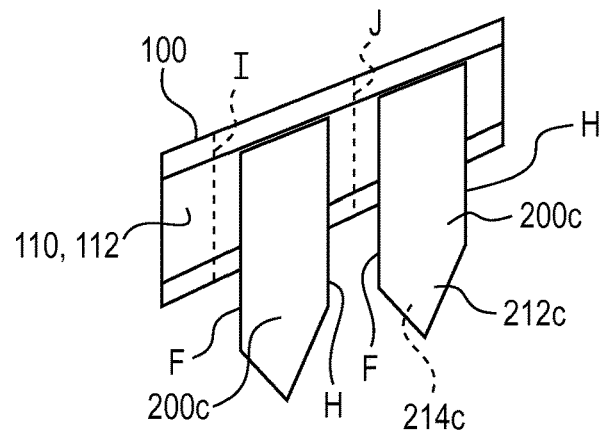
FIG. 15 is a perspective schematic view depicting a label stiffener system and multiple labels prior to their adherement to one another in accordance with the present subject matter.

FIG. 15 depicts another arrangement in which multiple labels such as labels 200c are positioned on the patterned adhesive layer 110 of the stiffener 100. The label 200c defines a front face 212c and an oppositely directed rear face 214c. In this version, a side edge F of each of the labels 200c is generally aligned with lines I and J shown on the stiffener 100. The top edges of the stiffener 100 and the labels 200c may be generally aligned with one another. One or more bottom edges of the labels 200c may or may not extend below the lower edge of the stiffener.

Figure 16:
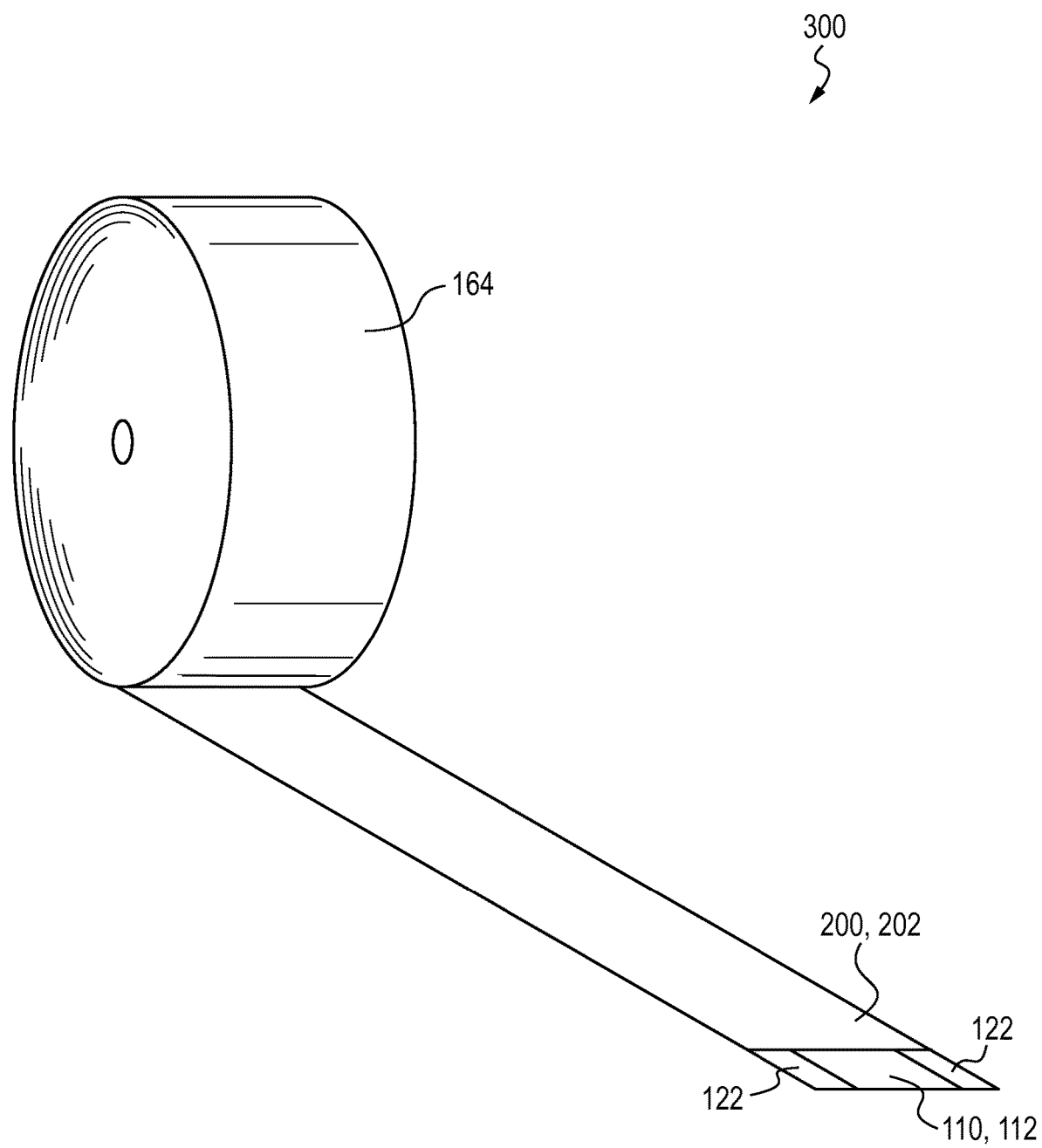
FIG. 16 is a perspective schematic view of an assembly of the stiffener system and label (s) in a roll form in accordance with the present subject matter.

The present subject matter also provides a combined assembly 300 of stiffener 100 and one or more label(s) 200. FIG. 16 depicts the combined assembly 300 in a roll. However, as previously described, the product can be provided in other forms. When provided in a roll form, typically, a front face 202 of the label 200 contacts the rear face 164 of the release material 160 in an adjacent section of the rolled assembly. The label 200 is adhered to the stiffener via the patterned adhesive 110. Again, it will be understood that the present subject matter includes alternate wound arrangements and a variety of different forms for the combined assembly of stiffener and labels. Furthermore, the present subject matter includes providing scores or weakened regions in one or both of the label and the stiffener system to facilitate separating sections of label(s) and/or stiffener from a larger section or supply such as a wound roll.

The present subject matter also provides various methods of affixing or attaching a label to a label channel. In many embodiments, a stiffener system is supplied to a retailer with one or more labels preapplied or adhered thereto. The combined label and stiffener system is then attached to label channel(s) such as along store shelves or displays. This strategy eliminates one or more operations for a retailer of attaching labels to backings or stiffeners; and enables the retailer to easily attach labels to label channels by inserting a stiffener/label in an open end of the label channel and sliding the stiffener/label within the channel to a desired location. The present subject matter methods may also involve providing a stiffener system as described herein and then adhering the label to a patterned adhesive region along a front face of the stiffener. The stiffener system is inserted within a receiving region of the label channel. Typically, the insertion of the stiffener system can be performed after label application. For example, a combined stiffener and label section can be inserted within or otherwise engaged with a label channel. However, the present subject matter includes methods in which only the stiffener system is inserted within the label channel. And then, after insertion, label(s) are adhered with the inserted stiffener.

Use of the present subject matter stiffener system and particularly when combined with one or more labels, enables a combined assembly of the stiffener and label(s) to be engaged with a label channel under a wide array of conditions such as low temperatures and/or high humidity. The label remains securely adhered to the stiffener because adherence between the label and the stiffener was performed under conditions more suitable for adhesive bond formation.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A label stiffener system comprising:
a first support defining a front face and a rear face;
a second support defining a front face and a rear face;
a layer of a first adhesive disposed between the first and the second support; and
a patterned region of a second adhesive disposed on the front face of the first support;
wherein the first support and the second support provide rigidity and stability for retaining one or more labels with a label channel or other display.

2. The stiffener system of claim 1 further comprising:
a layer of a release material disposed on the rear face of the second support.

3. The stiffener system of claim 1 wherein at least one of the first support and the second support includes a polymeric material.

4. The stiffener system of claim 3 wherein the polymeric material is selected from the group consisting of polyvinyl chloride, polyolefins, polyethylene terephthalate, polycarbonate, polystyrene, and combinations thereof.

5. The stiffener system of claim 1 wherein each of the first support and the second support has a thickness within a range of from 1 mil to 7 mil.

6. The stiffener system of claim 1 wherein both of the first adhesive and the second adhesive are pressure sensitive adhesives.

7. The stiffener system of claim 2 wherein the release material includes a silicone release agent.

8. The stiffener system of claim 1, where in the layer of the first adhesive is an acrylic adhesive.

9. The stiffener system of-claim 1, wherein the second adhesive is a hybrid acrylic adhesive.

10. The stiffener system of claim 1, wherein the second adhesive is a rubber based adhesive.

11. A combined label and stiffener system comprising:
a label; and
a stiffener system including (i) a first support defining a front face and a rear face, (ii) a second support defining a front face and a rear face, (iii) a layer of a first adhesive disposed between the first and the second support, and (iv) a patterned region of a second adhesive disposed on the front face of the first support, wherein the first support and the second support provide rigidity and stability for retaining one or more labels with a label channel or other display;
wherein the label is adhered to the patterned region of the second adhesive of the stiffener system.

12. The combined label and stiffener system of claim 11 further comprising:
a layer of a release material disposed on the rear face of the second support.

13. The combined label and stiffener system of claim 11 wherein at least one of the first support and the second support includes a polymeric material.

14. The combined label and stiffener system of claim 13 wherein the polymeric material is selected from the group consisting of polyvinyl chloride, polyolefins, polyethylene terephthalate, polycarbonate, polystyrene, and combinations thereof.

15. The combined label and stiffener system of claim 11 wherein each of the first support and the second support has a thickness within a range of from 1 mil to 7 mil.

16. The combined label and stiffener system of claim 11 wherein both of the first adhesive and the second adhesive are pressure sensitive adhesives.

17. The combined label and stiffener system of claim 11 wherein the release material includes a silicone release agent.

18. The combined label and stiffener system of claim 11, where in the layer of the first adhesive is an acrylic adhesive.

19. The combined label and stiffener system of claim 11, wherein the second adhesive is a hybrid acrylic adhesive.

20. The combined label and stiffener system of claim 11, wherein the second adhesive is a rubber based adhesive.

21. A method for affixing a label to a label channel, the method comprising:
providing a label;
providing a label channel defining a receiving region;
providing a stiffener system including (i) a first support defining a front face and a rear face, (ii) a second support defining a front face and a rear face, (iii) a layer of a first adhesive disposed between the first and the second support, and (iv) a patterned region of a second adhesive disposed on the front face of the first support, wherein the first support and the second support provide rigidity and stability for retaining the label with the label channel;
adhering the label to the patterned region of the second adhesive of the stiffener system;
inserting the stiffener system in the receiving region of the label channel, thereby affixing the label to the label channel.

22. The method of claim 21 wherein the inserting is performed prior to the adhering.

23. The method of claim 21 wherein the inserting is performed after the adhering.

* * * * *